Figure 1:
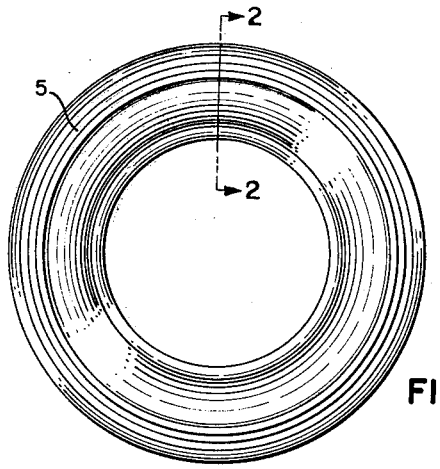

May 19, 1964　　　R. L. DOBSON　　　3,133,583
AIRPLANE TIRE AND RETREADING SAME
Filed Aug. 14, 1961

INVENTOR.
ROBERT L. DOBSON
BY
J.B. Holden
ATTORNEY

United States Patent Office 3,133,583
Patented May 19, 1964

3,133,583
AIRPLANE TIRE AND RETREADING SAME
Robert L. Dobson, Cuyahoga Falls, Ohio, assignor to The Goodyear Tire & Rubber Company, Akron, Ohio, a corporation of Ohio
Filed Aug. 14, 1961, Ser. No. 131,436
4 Claims. (Cl. 152—354)

This invention relates to an improved airplane tire. It includes at least one reinforcing cord ply in the tread and under this at least one or more reinforcing plies of rubber containing short lengths of wire or other filamentary material referred to herein as a filamentary ply or plies. The last-mentioned ply or plies are adjacent the carcass of a new tire, and in retreads, are separated from the carcass by a portion of the old undertread.

Airplanes, and particularly jet planes, both in taking off and in landing, travel at such high speeds that the treads of their tires are thrown out by centrifugal force. The reinforcing plies of this invention counteract the tread distortion caused by centrifugal force; and they provide improved protection to the tire against cuts, and reduce the rate of cut propagation, which would normally lead to a tire failure or rejection of the tire carcass for retreading. The reduction in tread distortion results in an increase in tread wear.

The tires of this invention include a ply adjacent the carcass which is made up of short discontinuous, discrete lengths of filamentary material which protects the tire from deep cuts and forms a strong bond between the tread and the carcass. Between this filamentary ply and the tread surface there is at least one reinforcing cord ply. The filamentary ply adjacent the carcass will be 0.008 to 0.250 inch thick depending on the tire size and non-skid depth (i.e. depth of the design grooves).

The advantages of locating a filamentary ply containing short lengths of filamentary material adjacent the carcass with at least one reinforcing cord tread ply include: (1) It gives added stiffness to the tire which reduces excessive distortion when running at high speed; (2) It provides protection to the tire from penetrating cuts and reduces the rate of cut propagation; (3) It makes a strong bond between the tread and the carcass of the tire, permitting the use of a thicker tread than would be possible with a conventional high speed rubber tread tire; (4) It increases tread life due to less distortion and the ability to use a thicker tread; (5) It increases tire safety by reducing danger of a sudden failure due to tire cuts.

In the preferred tires of this invention, the filamentary ply adjacent the carcass contains short lengths of wire. Preferably the wire is steel with a brass coating which forms a bond with the rubber. This wire may be 0.004 to 0.060 gauge. The wire is used in short lengths, for example 0.125 to 3 inches long. The amount of material per 100 pounds of rubber may vary from 0.50 percent to 60 percent by weight of the ply.

Other filamentary material in single strand or cable can be used including short lengths of cotton, rayon or nylon flock, rayon or nylon filaments or cords, used tire cord, etc. The gauge may vary from 0.001 to 0.10 inch. The length may vary from 0.125 to 3 inches long. The amount of material per 100 pounds of rubber may vary from 0.50 percent to 15 percent by weight of the ply.

The wire or other filamentary material is added to the rubber in any suitable manner. It can be added on the mill where it is thoroughly mixed with the rubber. Alternatively it can be uniformly spread over the entire width of the rubber as it enters the calender rolls. If added at the calender, it can be spread over a single ply of rubber or between two plies, or between each two plies if more than two plies are supplied to the calender. It may be added to the rubber in an extruder.

If the lengths of filamentary material are generally linear they will be orientated longitudinally in the rubber as the ply is milled, calendered or extruded. If the short lengths are bent sharply or curved they will not have a high degree of orientation. If the short lengths are orientated, the ply will have greater tensile strength in the direction of orientation.

Figure 3:
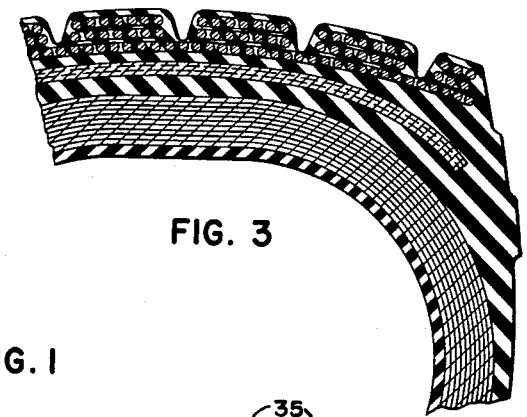
Figure 5:
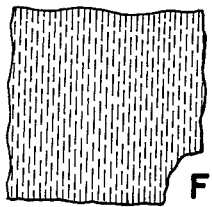
Figure 6:
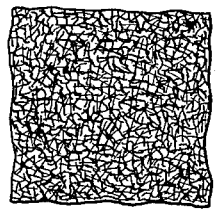
Figure 4:
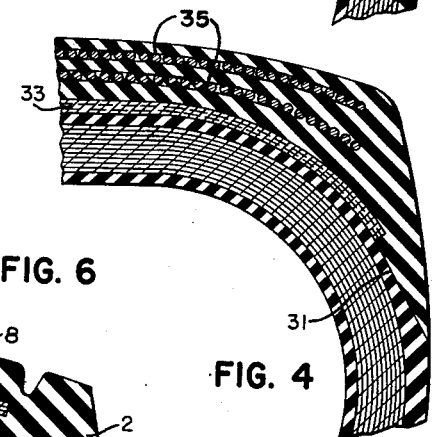
Figure 2:
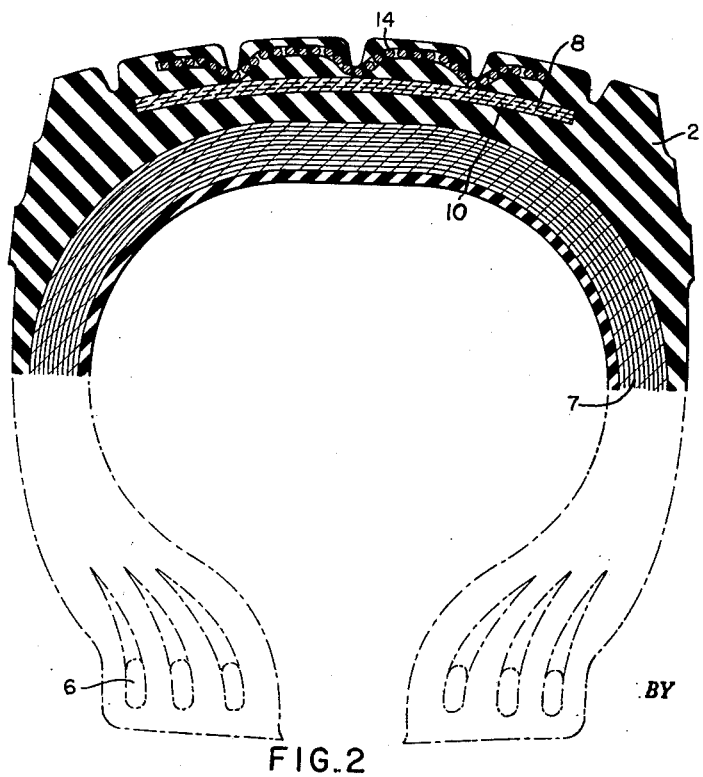
Figure 7:
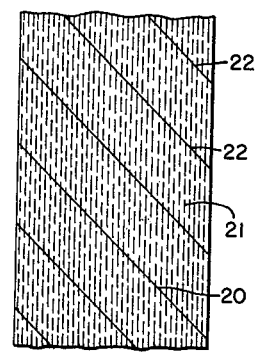

The invention is further described in connection with the accompanying drawings, in which—
FIG. 1 is a side view of a cured tire;
FIG. 2 is a radial section through this tire on the line 2—2 of FIGURE 1;
FIG. 3 is a portion of a radial section of a modification of the cured tire of FIGURE 2;
FIG. 4 is a section of a retreaded tire before curing;
FIG. 5 is a plan view of a reinforcing ply containing orientated short lengths of filamentary material;
FIG. 6 is a plan view of a reinforcing ply containing short lengths of unorientated filamentary material; and
FIG. 7 is a plan view of a reinforcing ply containing short lengths of orientated material, with lines indicating how such plies are to be cut to provide filamentary material orientated at an angle.

The drawings of the tires are illustrative. The invention is applicable to tubeless tires as well as tires with tubes. The tires are of standard construction except as otherwise described herein.

The tire 5 of FIGURES 1 and 2 includes beads 6 and radial or bias-laid cord or wire plies 7 embodied in a generally toroidal carcass which may be of any usual construction.

Across the crown of the tire is the filamentary ply 8 of rubber which contains short lengths of material 10 orientated at an angle of 0° to 90° to the center line of the tread. Preferably the filamentary material is wire orientated circumferentially. Between this filamentary ply and the outer tread surface is a reinforcing cord tread ply 14 with rubber insulation between the plies. The cord and filamentary reinforcing plies may vary in width 10 percent to 150 percent of the tire section width. Several narrow plies may be used side-by-side instead of a wider ply.

To orientate short lengths at an angle to the center line of the tread when the ply is wound circumferentially as it is incorporated in the tire, reference is had to the diagrammatic showing in FIGURE 7. The straight lengths of filamentary material 20 are orientated longitudinally in the ply 21. Then this ply is cut on the bias lines 22 to produce individual plies in which the filamentary material is orientated at a desirable angle.

FIGURE 4 illustrates the application of the invention to retreading. The tread rubber has been abraded away along the line 31 from one side of the tire to the other. The filamentary ply 33 is then placed over the abraded surface. (The short lengths of wire or other filamentary material may be orientated in any preferred manner within the ply 33.) The bias cord plies 35 are cross-laid over this, with rubber between the several plies. The retread is then completed and cured in the usual manner.

In the tires of this invention, as illustrated in the drawings, the tread plies are spaced from each other and from the carcass plies by distances greater than the distances between the plies in the carcass.

The drawings and description are illustrative. Changes will suggest themselves to the man skilled in the art.

The invention is covered in the claims which follow.

What I claim is:
1. A high-speed pneumatic airplane tire having laterally spaced beads, a generally toroidal carcass portion, and a grooved peripheral rubber tread portion, said carcass portion comprising plies of cord extending from bead to bead and embedded in rubber, a plurality of tread plies embedded in said tread, all of said tread plies being spaced from each other and from the outermost of said carcass plies by distances greater than the distances between the plies in said carcass portion, the radially innermost tread ply comprising short, discontinuous, discrete lengths of wire embedded in rubber, the radially outermost ply comprising generally parallel cords embedded in rubber, and parts of the radially outermost tread ply between the grooves in the tread being located outwardly of the bottoms of the grooves.

2. A high-speed pneumatic airplane tire as claimed in claim 1 which contains no more than two tread plies.

3. A high-speed pneumatic airplane tire as claimed in claim 1 in which there is 0.5 to 60 percent by weight of wire lengths.

4. A high-speed pneumatic airplane tire having laterally spaced beads, a generally toroidal carcass portion, and a peripheral rubber tread portion, said carcass portion comprising plies of cord extending from bead to bead and embedded in rubber, a plurality of tread plies embedded in said tread, said tread plies being spaced from each other and from the outermost of said carcass plies by distances greater than the distances between the plies in the carcass portion, the improvement in which the radially innermost tread ply is composed of tread rubber having embedded therein short, discontinuous, discrete lengths of wire.

References Cited in the file of this patent

UNITED STATES PATENTS

| | | |
|---|---|---|
| 1,894,237 | Mallory | Jan. 10, 1933 |
| 2,237,819 | Hawkinson | Apr. 8, 1941 |
| 2,943,663 | Antonson | July 5, 1960 |
| 2,984,282 | Vittorelli | May 16, 1961 |
| 3,018,814 | Saint-Paul | Jan. 30, 1962 |
| 3,057,389 | Dubetz et al. | Oct. 9, 1962 |